United States Patent [19]

Ohishi et al.

[11] Patent Number: 5,537,185
[45] Date of Patent: Jul. 16, 1996

[54] CAMERA-SHAKE DISPLAY DEVICE

[75] Inventors: Sueyuki Ohishi, Tokyo; Susumu Sato, Chiba; Hideya Inoue, Yokohama; Akira Katayama, Koganei, all of Japan

[73] Assignee: Nikon Corporation, Tokyo, Japan

[21] Appl. No.: 432,255

[22] Filed: May 1, 1995

Related U.S. Application Data

[63] Continuation of Ser. No. 159,944, Dec. 1, 1993, abandoned, which is a continuation of Ser. No. 43,767, Apr. 6, 1993, abandoned.

[30] Foreign Application Priority Data

Apr. 9, 1992 [JP] Japan ................................ 4-088777

[51] Int. Cl.⁶ ...................................... G03B 17/18
[52] U.S. Cl. ........................................ 354/472; 354/202
[58] Field of Search ........................ 354/430, 202, 354/465, 471–475, 289.1, 289.12; 348/208

[56] References Cited

U.S. PATENT DOCUMENTS

| | | | |
|---|---|---|---|
| 4,862,277 | 8/1989 | Iwaibana | 358/222 |
| 5,117,246 | 5/1992 | Takahashi et al. | 354/202 |
| 5,198,856 | 3/1993 | Odaka et al. | 354/430 |
| 5,402,197 | 3/1995 | Okano et al. | 354/289.12 X |
| 5,416,554 | 5/1995 | Hamoda et al. | 354/430 X |
| 5,420,661 | 5/1995 | Hamoda et al. | 354/430 X |
| 5,463,443 | 10/1995 | Tanaka et al. | 354/472 X |

*Primary Examiner*—W. B. Perkey
*Attorney, Agent, or Firm*—Shapiro and Shapiro

[57] ABSTRACT

A camera-shake display device comprises a detection unit for determining whether a photographing lens detachably mounted on a camera body is provided with a compensation optical system for compensating camera-shake upon reception of a signal representing the camera-shake amount corresponding to a displacement of the camera body, and a display unit for displaying whether the camera-shake compensation is attainable or not in accordance with the output of the detection unit.

32 Claims, 6 Drawing Sheets

CAMERA-SHAKE DISPLAY DEVICE

This is a continuation of application Ser. No. 08/159,944 filed Dec. 1, 1993, which is a continuation of application Ser. No. 08/043,767 filed Apr. 6, 1993, both abandoned.

BACKGROUND OF THE INVENTION

1. Field of the Invention

The present invention relates to a camera-shake display device mounted on a photographing lens-detachable camera for displaying information on camera-shake.

2. Related Background Art

In a photographing lens-detachable camera having an anti-vibration function, a device which detects camera-shake and shifts an anti-vibration lens in accordance with a detected amount has been known.

In the prior art camera, however, it is not possible for a user of a camera to quickly determine whether a lens is mounted or not, or whether the lens has an anti-shake mechanism or not. Further, it is not possible for the user of the camera to determine whether a camera-shake suppressed photograph may be taken by an operation of the anti-shake mechanism, or how much camera-shake should be suppressed for a lens currently mounted because the permitted amount of camera-shake differs for different types of lens, or whether the amount of camera-shake is within a permitted range of camera-shake for the lens mounted.

SUMMARY OF INVENTION

It is an object of the present invention to provide a camera-shake display device which informs various information reguarding camera-shake to a user of a camera.

In accordance with one embodiment of the present invention, the camera-shake display device comprises a detection unit (for example, step S207 in FIG. 4) for determining whether a photographing lens detachably mounted on a camera body is provided with a compensation optical system for compensating the camera-shake upon reception of a signal representing camera-shake amount corresponding to a displacement of the camera body, from the camera body or the photographing lens, and a display unit (for example, steps S212 and S213 in FIG. 4) for displaying in accordance with an output of the detection unit whether the camera-shake compensation is attainable or not.

In the camera-shake display device of this embodiment, whether the camera-shake compensation is attainable or not is displayed.

Figure 4:
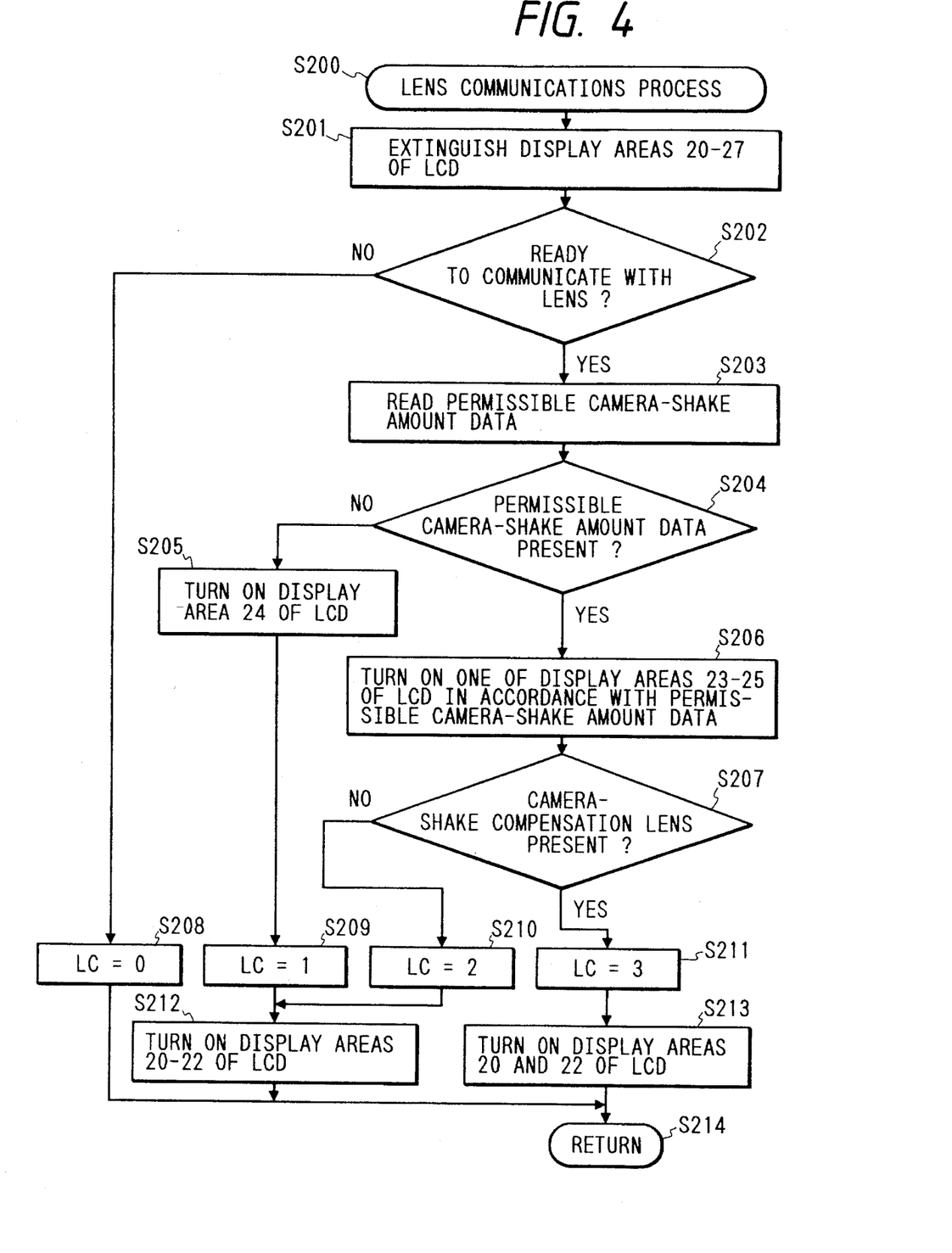
FIG. 4 shows a flow chart of the lens communication process of FIG. 3.

In accordance with another embodiment of the camera-shake display device, when the detection unit determines that the photographing lens is provided with the compensation optical system, the display is made to indicate that the camera-shake compensation is attainable (for example, step S213 of FIG. 4), and when the detection unit determines that the photographing lens is not provided with the compensation optical system, the display is made to indicate that the camera-shake compensation is not attainable (for example, step S212 of FIG. 4).

In accordance with this embodiment of the camera-shake display device, when the photographing lens is provided with the compensation optical system, the display is made to indicate that the camera-shake compensation is attainable. When it is not provided, the display is made to indicate that the camera-shake compensation is not attainable.

In accordance with another embodiment, the camera-shake display device comprises a mount detection unit (for example, step S202 of FIG. 4) for determining whether the photographing lens detachably mounted on the camera body is mounted on the camera body or not, and an extinguish unit (for example, step S208 of FIG. 4) for extinguishing the display of the display unit when the mount detection unit determines that the photographing lens is not mounted on the camera body.

In accordance with the camera-shake display device of this embodiment, the display is extinguished when the photographing lens is not mounted on the camera body.

In another embodiment, the camera-shake display device comprises a detection unit (for example, step S204 of FIG. 4) for determining whether the photographing lens detachably mounted on the camera body has data indicating the permissible cameras-shake amount or not, and a display unit for displaying a predetermined permissible camera-shake amount when the detection unit determines that the photographing lens which does not have the data indicating the permissible camera-shake amount is mounted (for example, step S205 of FIG. 4) and displaying permissible camera-shake amount based on the data provided by the photographing lens indicating the permissible camera-shake amount when the detection unit determines that the photographing lens which has the permissible camera-shake amount is mounted (for example, step S206 of FIG. 4).

In accordance with the camera-shake display device of this embodiment, the predetermined permissible camera-shake amount is displayed when the photographing lens which does not have the data of the permissible camera-shake amount is mounted; The permissible camera-shake amount is displayed based on the data provided by the photographing lens indicating the permissible camera-shake amount when the photographing lens which has the data of the permissible camera-shake amount is mounted.

In another embodiment, the camera-shake display device comprises a camera-shake amount detection means (for example, steps S302–S312 of FIG. 5) for detecting the camera-shake amount representing a displacement of the camera body on which the photographing lens is detachably mounted, a display unit (for example, step S313 of FIG. 6) for displaying the camera-shake amount detected by the camera-shake amount detection unit, amount detection unit (for example, step S310 of FIG. 5) for determining whether the photographing lens is mounted on the camera body, and an inhibit unit (for example, step S311 of FIG. 5) for inhibiting the display by the display unit when the mount detection unit determines that the photographing lens is not mounted on the camera body.

In accordance with the camera-shake display device of this embodiment, the camera-shake amount is displayed when the photographing lens is mounted on the camera body, and the display of the camera-shake amount is inhibited when the photographing lens is not mounted.

Figure 1:
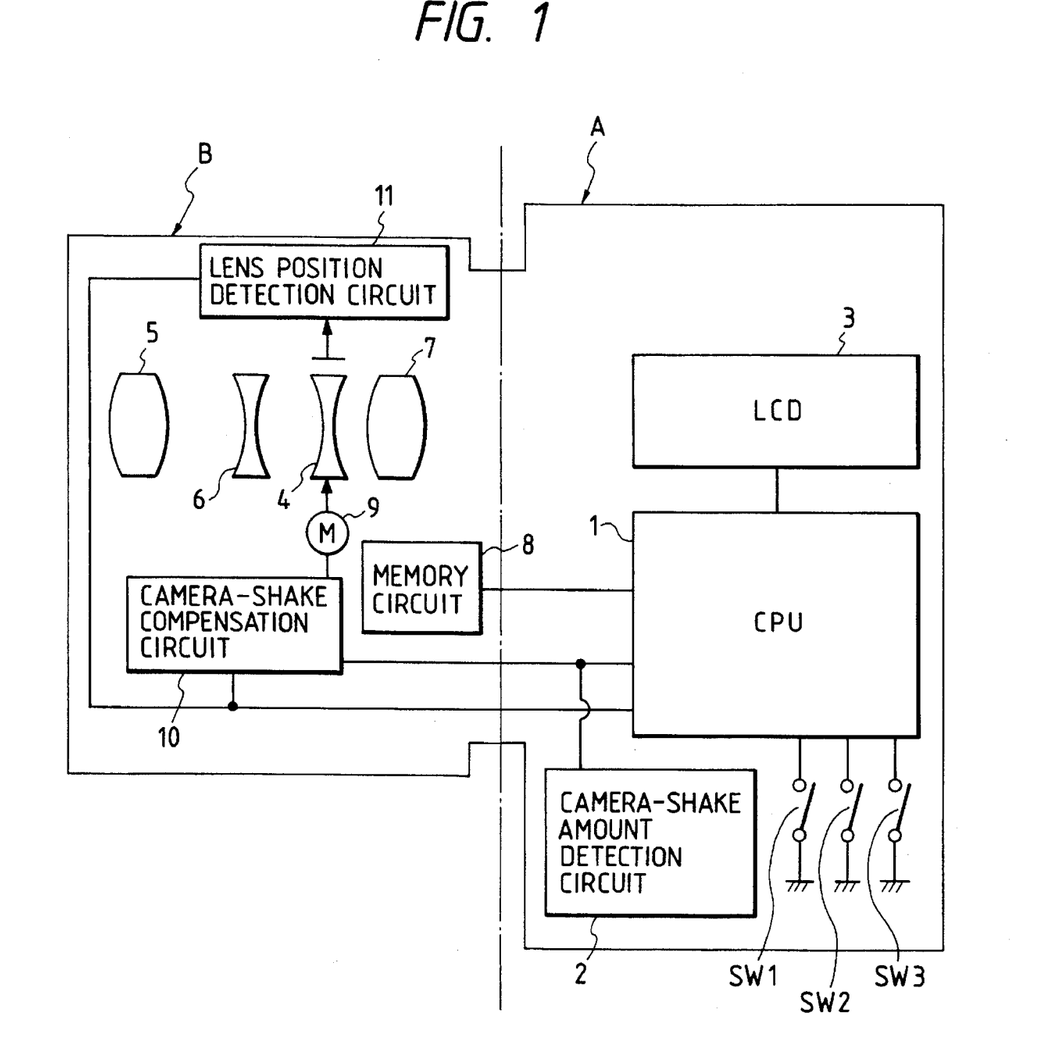
FIG. 1 shows a circuit block diagram of a camera having a camera-shake display device in accordance with one embodiment of the present invention.

In another embodiment, the camera-shake display device comprises a camera-shake amount detection unit (for example, steps S302–S312 of FIG. 5) for detecting camera-shake amount representing a displacement of the camera body on which the detachable photographing lens is mounted, a camera-shake compensation unit (for example, steps S304–S309 of FIG. 5) for compensating the camera-shake in accordance with the camera-shake amount detected by the camera,shake amount detection unit, a compensation amount detection unit (for example, detected by CPU 1 based on the signal of the lens position detection circuit 11 of FIG. 1) for detecting the camera-shake compensation amount compensated by the camera-shake compensation unit, a calculation unit for calculating remaining camera-shake amount by subtracting the camera-shake compensation amount from the camera-shake amount, and a display unit (for example, step S315 of FIG. 6) for displaying the remaining camera-shake amount calculated by the calculation unit.

In accordance with the camera-shake display device of this embodiment, the remaining camera-shake amount which is the difference between the camera-shake amount and the camera-shake compensation amount is displayed.

In another embodiment, the camera-shake display device comprises a detection unit (for example, step S314 of FIG. 6) for determining whether the photographing lens is provided with the compensation optical system for compensating the camera-shake in accordance with the camera-shake amount, and an inhibit unit (for example, step S316 of FIG. 6) for inhibiting the display by the display unit when the detection unit determines that the photographing lens is not provided with the compensation optical system.

In accordance with the camera-shake display device of this embodiment, the display is inhibited when the photographing lens is not provided with the compensation optical system.

DETAILED DESCRIPTION OF THE PREFERRED EMBODIMENTS

An embodiment of the present invention is now explained with reference to the drawings.

FIG. 1 shows a circuit block diagram of a camera having the camera-shake display device of the present invention.

The camera circuit generally comprises a camera body A and a photographing lens B detachably mounted on the camera body.

In the camera body A, a main switch SW1 for initiating an operation of the camera, a partial depress switch SW2 which is turned on by partially depressing a release button, a release switch SW3 which is turned on when the release button is fully depressed, a camera-shake detection circuit 2 for detecting the of camera-shake, and an LCD 3 which includes a liquid crystal display device are connected to a CPU 1.

Arranged in the photographing lens B (hereinafter simply referred to as a lens) which can communicate with the camera body A are photographing lenses 4, 5, 6 and 7 including a camera-shake compensation lens for compensating the camera-shake, a memory circuit 8 which stores lens information and transfers it to the CPU 1 by a command from the CPU 1, a camera-shake compensation motor 9 for driving the camera-shake compensation lens 4, a camera-shake compensation circuit 10 which controls the camera-shake compensation motor, and a lens position detection circuit 11 which detects the position of the camera-shake compensation lens 4 and reports the position to the camera-shake correction circuit 10 and the CPU 1.

In the circuit shown in FIG. 1, the lens having an anti-shake mechanism is mounted. Depending on the type of lens, the camera-shake correction lens 4, the camera-shake compensation motor 9, the camera-shake compensation circuit 10, the lens position detection circuit 11 and/or the memory circuit 8 may be omitted.

The CPU 1 is a one-chip microcomputer which controls a sequence of the camera and has a function to drive the LCD 3.

A camera-shake amount detection circuit 2 of the camera body A detects the camera-shake amount, and the camera-shake compensation circuit 10 drives the camera-shake lens compensation 4 in accordance with the output of the camera-shake amount detection circuit 2.

The lens position detection circuit 11 detects the position of the camera-shake compensation lens 4 and feeds the output thereof back to the camera-shake compensation circuit 10 for negative feedback control to attain accurate camera-shake compensation.

The outputs of the camera-shake amount detection circuit 2 and the lens position detection circuit 11 are supplied to the CPU 1 so that the CPU 1 may determine the camera-shake amount and determine the compensation amount of the camera-shake compensation lens 4 based on the output of the lens position detection circuit 11, and also determine a difference from the detected camera-shake to determine the camera-shake amount remaining after the camera-shake compensation.

The main switch SW1 is a status switch having an on position and an off position. Once it is set to the on position by the user, it is held in the on position until it is returned to the off position.

The LCD 3 externally displays necessary information such as the camera-shake amount, the camera-shake amount remaining after the camera-shake compensation, or a permitted camera-shake amount which varies with the photographing lens mounted, by a command of the CPU 1.

Figure 2:
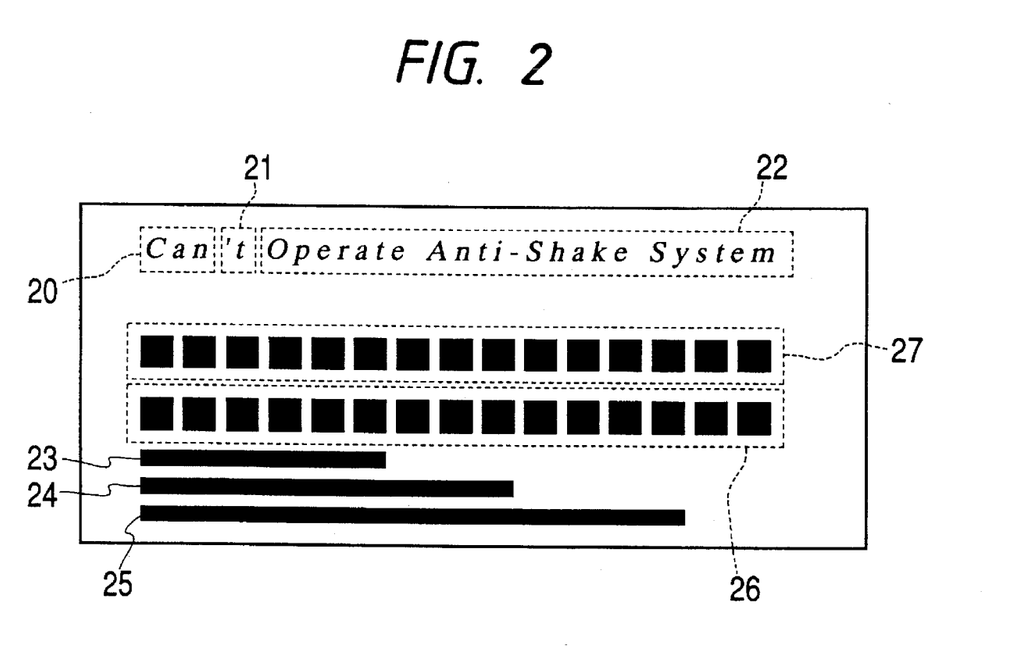
FIG. 2 shows an example of display by an LCD of FIG. 1.

FIG. 2 shows an example of the display of the LCD 3. The turn-on of display areas 20 and 22 and the turn-off of a display area 21 indicate that the camera-shake compensation system is operable. The turn-off of the display areas 20, 21 and 22 indicates that the camera-shake compensation system is not operable.

Display areas 23, 24 and 25 indicate permitted camera-shake amounts (camera-shake amounts permissible for photographing) which vary from lens to lens. One of those areas is turned on depending on the type of lens mounted.

A display area 26 indicates a magnitude of camera-shake amount by changing the number of turned-on elements in accordance with the magnitude of the output of the camera-shake detection circuit 2, and indicates to the user whether the camera-shake amount is within a permissible range or not, by the indication of the permissive camera shake amount in the display area 23, 24 or 25.

A display area 27 displays the magnitude of the camera-shake amount remaining after the camera-shake compensation by changing the number of turned-on elements based on the magnitude of the difference between the output of the camera-shake amount detection circuit 2 and the camera-shake compensation amount derived from the output of the lens position detection circuit 11, and indicates to the user whether the camera-shake amount remaining after the camera-shake compensation is within the permissible range by the display of the permissive camera-shake amount in the display area 23, 24 or 25.

An operation of the camera-shake display device of the present embodiment is now explained in detail with reference to the flow charts of FIGS. 3–6.

The processes shown in those flow charts show only those portions of the program contained in the CPU 1 which relate to the present embodiment.

Figure 3:
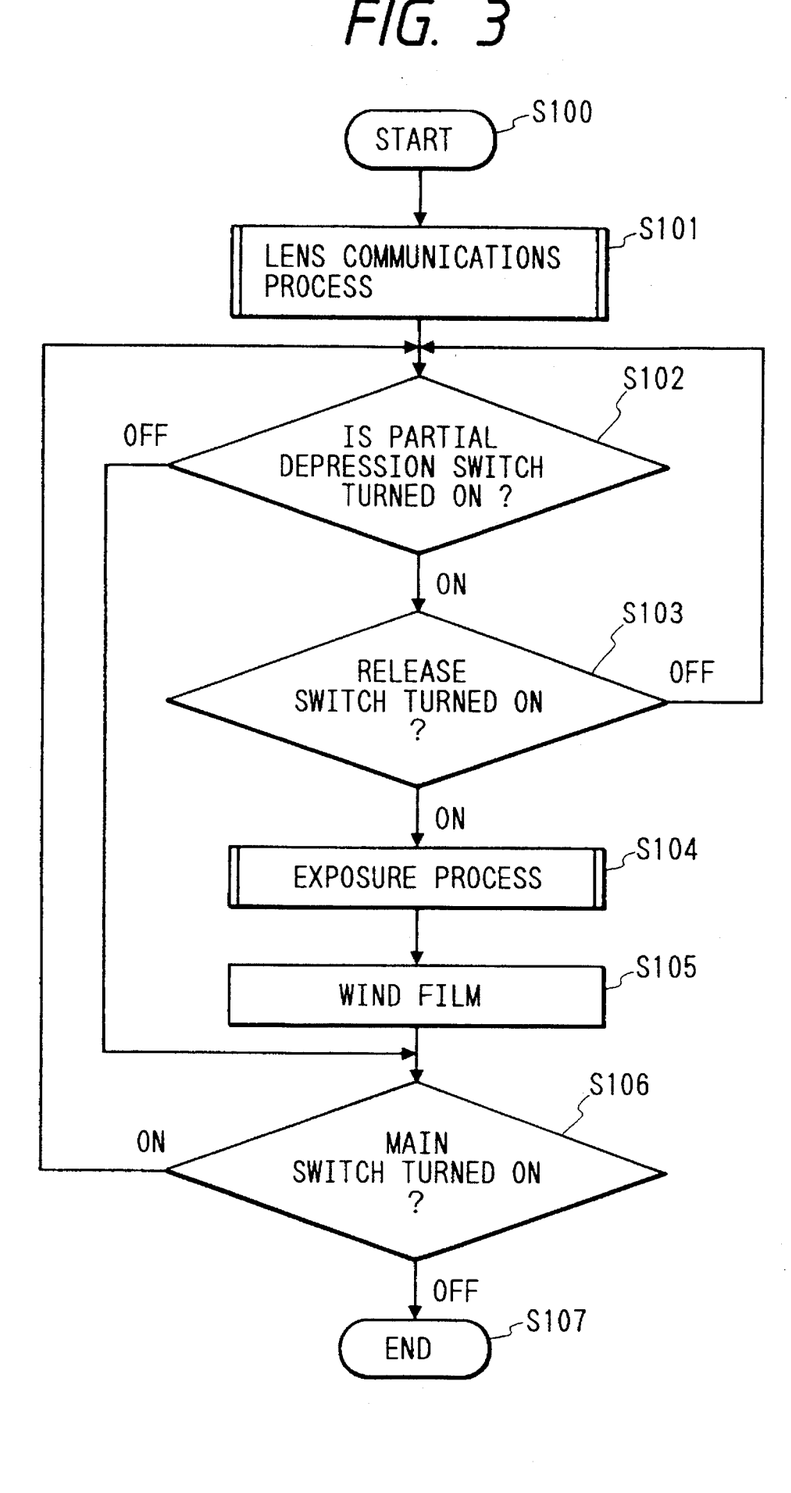
FIG. 3 shows a flow chart of an overall operation of the camera-shake display device of FIG. 1.

FIG. 3 shows an overall flow of the operation of the present embodiment. When the main switch SW1 is turned on, the process starts (step S100).

Communication with the mounted lens is first conducted, and the permissive camera-shake amount is displayed based on the read data (step S101). Details thereof will be explained with reference to FIG. 4.

Then, the turn-on/off state of the partial depress switch SW2 is determined (step S102). If the partial depress switch SW2 is in the off position, the process proceeds to a step S106.

On the other hand, if the partial depress switch SW2 is in the on position, the turn-on/off state of the release switch SW3 is determined (step S103). If the release switch SW3 is in the off position, the process returns to the step S102.

When the release switch is in the on position, an exposure process is executed (step S104).

In the exposure process, steps of detecting the camera-shake amount, controlling the camera-shake compensation and displaying the camera-shake amount during the exposure are executed. Details thereof will be explained with reference to FIGS. 5 and 6.

When the exposure process is completed, a film is wound up (step S105) and the on/off state of the main switch SW1 is determined (step S106). If it is in the on position, the process returns to the step S102, and if it is in the off position, a series of steps relating to the present embodiment are terminated (step S107).

FIG. 4 shows a sub-flow chart of the lens communication process in the step S101 of FIG. 3. In this process, communication is made with the mounted lens to determine the type of mounted lens and the mount state based on the read data, and the permitted camera-shake amount for the corresponding type is displayed on the LCD 3.

The series of steps are started by a call of the step S101 of FIG. 3 (step S200).

The display of the display areas 20 to 27 of the LCD 3 is totally extinguished (step S201).

Then, it is determined if the communication with the lens is permitted (step S202).

This is done by reading data from the memory circuit 8 of the photographing lens B. If no data is sent, it is determined that the communication is not attainable, and if data is sent, it is determined that the communication is attainable.

When the communication with the lens is not attainable, it is assumed that the lens has not been mounted on the camera body A, and in a step S208, "0" is entered to LC, and the series of steps of FIG. 4 are terminated in FIG. 4 (step S214).

LC is a name of a RAM contained in the CPU 1, and entering "0" to the LC means to store "0" in the RAM.

When the communication with the lens is attainable, the permissible camera-shake amount data is read from the memory circuit 8 (step S203).

It is assumed that for the lens designed by taking the anti-shake function into consideration a permissible camera-shake amount which is appropriate to that lens is previously stored in the memory circuit 8, and for other types of lenses, no such permissible amount is stored.

Whether the data of the permissible camera-shake amount is present or not is determined (step S204), and if such data is not present, the display area 24 of the LCD 3 is turned on in a step S205.

In the present embodiment, when there is no data of the permissible camera-shake amount, the display area 24 of the LCD 3 is turned on an intermediate permissible amount, although a larger or smaller permissible amount may be set.

Then, "1" is entered into the LC (step S209), and the display areas 20, 21 and 22 of the LCD 3 are turned on (step S212).

Thus, the user is informed that the mounted lens cannot compensate for camera-shake, that is, it does not have an anti-shake mechanism.

The series of steps of FIG. 4 are then terminated (step S214).

If the data of the permissible camera-shake amount is present in the step S204, only one of the display areas 23, 24 and 25 of the LCD 3 which corresponds to the read permissible camera-shake amount is turned on (step S206).

Then, whether the lens is capable of compensating the camera-shake or not is determined (step S207), and if it is not capable, the process proceeds to a step S210, and if it is capable, the process proceeds to a step S211.

Whether the lens is capable of compensating the camera-shake or not is determined, with reading by the CPU 1, the data representing whether the lens is capable of compensating the camera-shake or not previously stored in the memory circuit 8.

When the lens is not capable of compensating the camera-shake, "2" is entered into the LC (step S210) and then the display areas 20, 21 and 22 of the LCD 3 are turned on (step S212) to inform the user that the mounted lens is not capable of compensating the camera-shake, that is, it does not have the anti-shake mechanism. Then, the series of steps of FIG. 4 are terminated (step S214).

On the other hand, if the lens is capable of compensating the camera-shake, "3" is entered in the LC (step S211) and the display areas 20 and 22 of the LCD 3 are turned on to inform the user that the mounted lens is capable of compensating the camera-shake, that is, it has the anti-shake mechanism. Then, the series of steps of FIG. 4 are terminated (step S214).

In the series of step of FIG. 4, "0", "1", "2" and "3" are entered into the LC in the following four cases, respectively: where the lens is not mounted; where the lens is mounted, the data of permissible camera-shake amount is not present, and the lens does not have the anti-shake function; where the lens is mounted, the data of the permissible camera-shake amount is present, and the lens does not have the anti-shake function; and where the lens is mounted, the data of the permissible camera-shake amount is present, and the lens has the anti-shake mechanism.

Where the lens has not been mounted, the display of the permissible camera-shake amount and whether the camera-shake compensation is attainable or not is not effected.

On the other hand, where the lens is mounted and the data of the permissible camera-shake amount is not in the memory circuit 8, a predetermined permissible camera-shake amount is displayed. Where the data of the permissible camera-shake amount is in the memory circuit 8, the permissible camera-shake amount corresponding to the stored permissible amount is displayed.

Where the lens is mounted but it is not capable of compensating the camera-shake, that is, does not have the anti-shake mechanism, display is made to indicate that the camera-shake compensation is not attainable, and where the lens has the anti-shake function, display is made to indicate that the camera-shake compensation is attainable.

Figure 5:
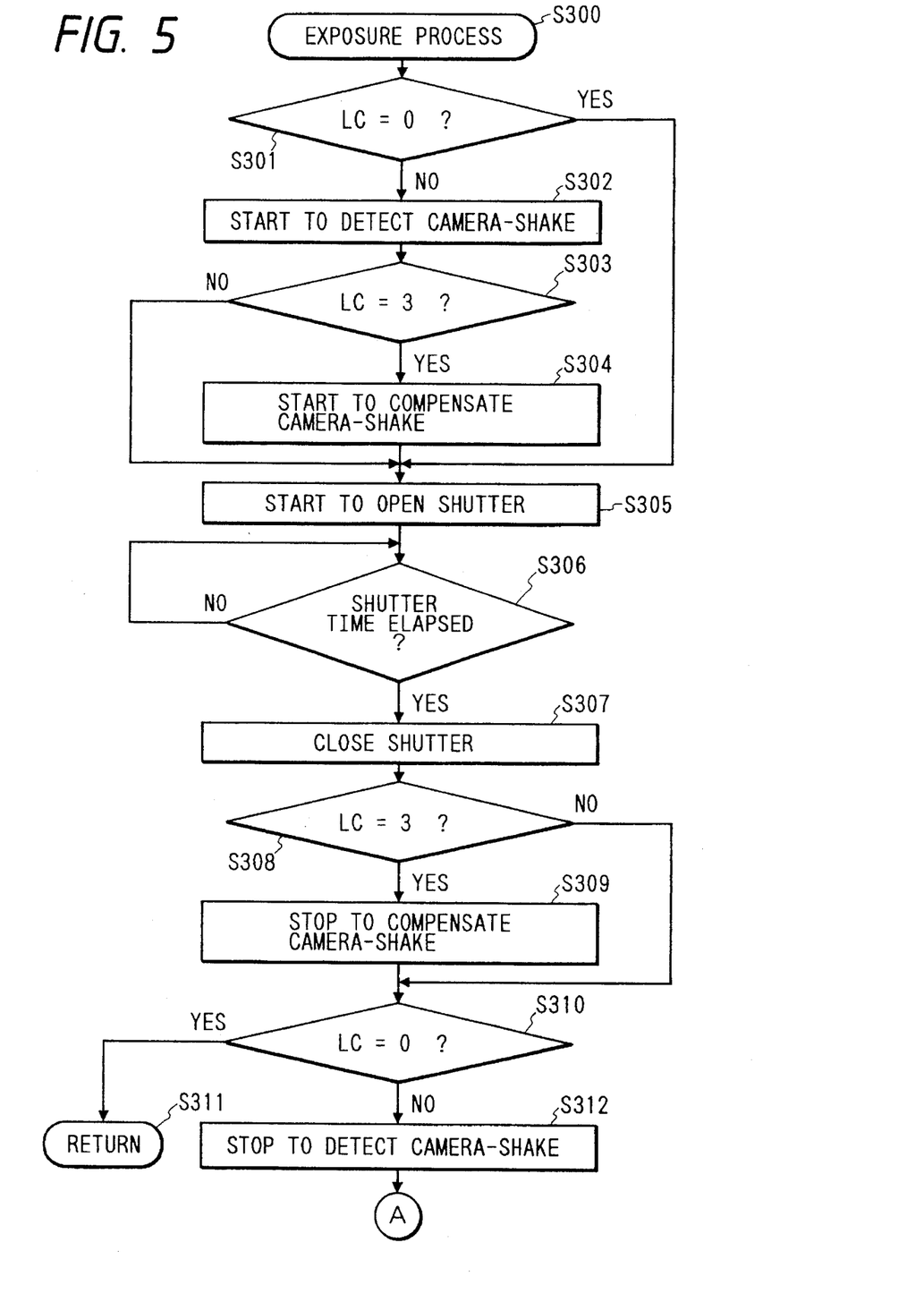
FIG. 5 shows a flow chart of the exposure process of FIG. 3.
Figure 6:
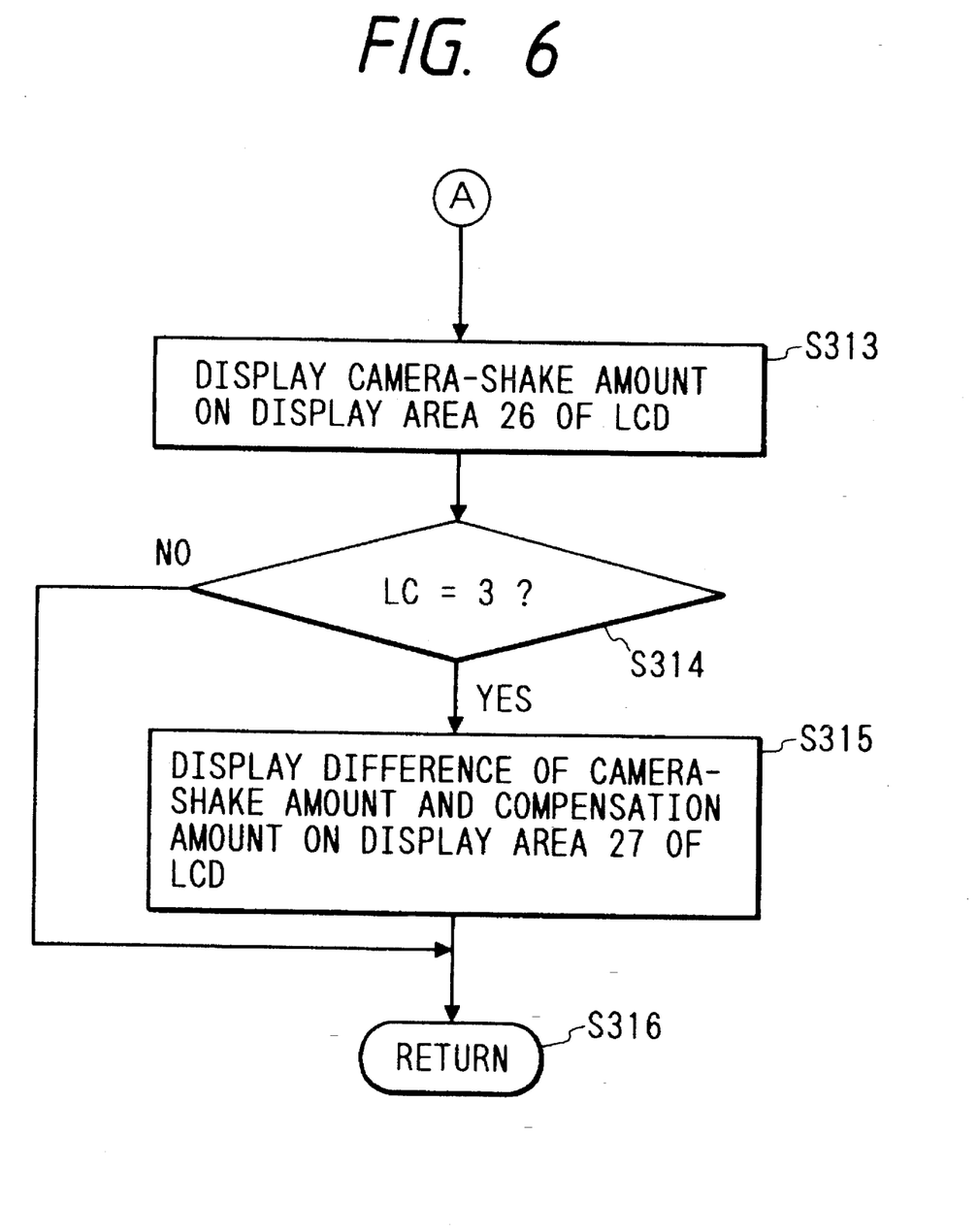
FIG. 6 shows a flow chart of the exposure process.

FIGS. 5 and 6 show sub-flow charts of the exposure process of the step S104 of FIG. 3. In those flows, the exposure process, the detection of the camera-shake amount during the exposure, the control of the camera-shake compensation and the display of the camera-shake amount during the exposure are effected. The process is started by a call of the step S104 of FIG. 3.

First, whether the LC is "0" or not is determined (step S301). If the LC is "0", that is, when the lens has not been mounted, the process proceeds to a step S305. When the LC is not "0", that is, when the lens is mounted, the camera-shake amount detection circuit 2 is activated to start the detection of the camera-shake (step S302).

Whether the LC is "3" or not is determined (step S303). If the LC is not "3", that is, if the lens does not have the anti-shake mechanism, the process proceeds to a step S305. If the LC is "3", that is, when the lens has the anti-shake mechanism, the camera-shake compensation circuit 10 is activated to start the correction of the camera-shake (step S304).

Then, opening of a shutter (not shown) is started (step S305) and when a shutter time has elapsed (step S306), the shutter is closed (step S307).

Then, whether the LC is "3" or not is determined (step S308). If the LC is not "3", that is, when the lens does not have the anti-shake mechanism, the process proceeds to S310. If the LC is "3", that is, when the lens has the anti-shake function, the camera-shake compensation circuit 10 is deactivated and the camera-shake compensation is terminated (step S309).

Then, whether the LC is "0" or not is determined (step S310). If the LC is "0", that is, when the lens has not been mounted, the series of steps are terminated (step S311) and the process proceeds to a step S105 of FIG. 3.

On the other hand, if the LC is not "0", that is, when the lens is mounted, the camera-shake amount detection circuit 2 is deactivated and the detection of the camera-shake is terminated (step S312).

The camera-shake amount detected by the camera-shake amount detection circuit 2 during the exposure or more precisely during the period from the step S304 to the step S312 is displayed on the display area 26 of the LCD 3 (step S313 of FIG. 6).

In the display area 26 of the LCD 3, the number of turned-on elements is varied with the detected camera-shake amount, and the elements are sequentially turned on from the left.

The camera-shake amount detected by the camera-shake amount detection circuit 2 is, in a strict sense, different from the camera-shake amount during the exposure, but if the time required for the process from the step S307 to the step S312 is negligibly smaller than the exposure time, the detected camera-shake amount is substantially equal to the camera-shake amount during the exposure.

In the present embodiment, the camera-shake amount detection during the exposure is detected based on the difference between a maximum and a minimum of the camera-shake amount during the exposure.

The camera-shake amount is detected by monitoring, with the CPU 1, the output of the camera-shake amount detection circuit 2 during the period from the step S302 to the step S312 of FIG. 5, storing the maximum and the minimum thereof, and taking the difference therebetween as the camera-shake amount during the exposure.

After the camera-shake amount has been displayed on the display area 26 of the LCD 3, whether the LC is "3" or not is determined (step S314). If the LC is not "3", that is, when the lens does not have the anti-shake function, the series of steps are terminated (step S316) and the process proceeds to a step S105 of FIG. 3.

On the other hand, if the LC is "3", that is, if the lens has the anti-shake function, the actual camera-shake amount detected by the lens position detection circuit 11 is deducted from the detected camera-shake amount, and the camera-shake amount remaining after the camera-shake compensation is displayed on the display area 27 of the LCD 3.

The camera-shake compensation amount detected by the lens position detection circuit 11 is, in a strict sense, different from the camera-shake compensation amount during the exposure. However if the time required for the process from the step S307 to the step S309 is negligibly smaller than the exposure time, the detected camera-shake compensation amount is substantially equal to the camera-shake compensation amount during the exposure time, and the difference between the camera-shake amount and the camera-shake compensation amount is substantially equal to the camera-shake amount remaining after the camera-shake correction during the exposure.

In the display of the camera-shake amount remaining after the camera-shake compensation, the number of turned-on elements is varied in accordance with the camera-shake amount remaining after the camera-shake compensation and they are sequentially turned on from the left, as they are in the display area 26 of the LCD 3.

In the present embodiment, the camera-shake amount during the exposure is detected based on the difference between a maximum and a minimum of the camera-shake compensation amount during the exposure.

The output of the lens position detection circuit 11 during the period from the step S304 to the step S309 of FIG. 5 is monitored by the CPU 1, the maximum and the minimum thereof are stored, and the difference therebetween is taken as the camera-shake compensation amount.

The camera-shake amount remaining after the camera-shake compensation is displayed on the display area 27 of the LCD 3, and the series of steps are terminated (step S316). The process proceeds to the step S105 of FIG. 3.

In the series of steps of FIGS. 5 and 6, the camera-shake amount during the exposure is displayed if the lens has been mounted, and if the mounted lens has the anti-shake function, the camera-shake amount remaining after the camera-shake compensation during the exposure is additionally displayed.

Where the lens has not been mounted, the camera-shake amount during the exposure and the camera-shake amount remaining after the camera-shake compensation during the exposure are not displayed.

In the camera-shake display device of the present embodiment, since whether the camera-shake compensation is attainable or not is displayed on the display areas 20, 21 and 22, the user can easily determine whether the camera-shake compensation is attainable or not when he/she mounts the photographing lens.

Where the photographing lens is not mounted on the camera body, the display areas 20 to 27 are turned off. Thus, it is easy for the user to determined that the camera-shake compensation is not attainable because the photographing lens is not mounted.

Where the photographing lens which does not have the data of the permissible camera-shake amount is mounted, the predetermined permissible camera-shake amount is displayed on one of the display areas 23, 24 and 25. When the photographing lens which has the data of the permissible camera-shake amount is mounted, the permissible camera-shake amount is displayed on one of the display areas 23, 24 and 25 based on the data of the permissible camera-shake amount which the photographing lens has. Thus, the permissible camera-shake amount of the photographing lens can be positively displayed.

Since the remaining camera-shake amount which is the difference between the camera-shake amount and the camera-shake compensation amount is displayed on the display area 27, the camera-shake amount remaining after the compensation, that is, the camera-shake amount remaining on the photograph can also be determined.

In the present embodiment, the liquid crystal display device is used as the display means although other display means such as LED may be used for the display.

The memory circuit 8 may be in the one-chip microcomputer, and the one-chip microcomputer may control the camera-shake compensation circuit 10 and the lens position detection circuit 11.

In the present embodiment, the camera-shake detection circuit for detecting the camera-shake amount is arranged in the camera body A, although it may be arranged in the photographing lens B.

In the present embodiment, the fact that the camera-shake compensation is attainable is displayed by the turn-on of the display areas 20, 21 and 22 and the fact that the camera-shake compensation is not attainable is displayed by the turn-on of the display areas 20 and 22. Alternatively, when the camera-shake compensation is attainable, it may be displayed by o and when the camera-shake compensation is not attainable, it may be displayed by ×. That is, the display of the turned-on display area may be switched. Alternatively o may be displayed only when the camera-shake compensation is attainable and the display area is turned off when the camera-shake compensation is not attainable. That is, the display area may be switched between the turn-on state and the turn-off state.

In accordance with the camera-shake display device of the present invention, since whether the camera-shake compensation is attainable or not is displayed, the user can easily determine whether the camera-shake compensation is attainable or not when he/she mounts the photographing lens.

In accordance with the camera-shake display device of another embodiment, the display is turned off when the photographing lens is not mounted on the camera body. Accordingly, the user can easily understand that the camera-shake compensation is not attainable because the photographing lens is not mounted.

In the camera-shake display device of another embodiment, the predetermined permissible camera-shake amount is displayed when the photographing lens which does not have the data of the permissible camera-shake amount is mounted, and when the photographing lens which has the data of the permissible camera-shake amount is mounted, the permissible camera-shake amount is displayed based on the data of the permissible camera-shake amount which the photographing lens has. Accordingly, the permissible camera-shake amount of the photographing lens is positively displayed.

In accordance with the camera-shake display device of another embodiment, when the photographing lens is not mounted on the camera body, the display is turned off so that the user is prevented from mistakenly believing that the camera is ready for photographing.

In accordance with the camera-shake display device of another embodiment, when the photographing lens is mounted on the camera body, the camera-shake amount is displayed, and when it is not mounted, the camera-shake amount is not displayed. Accordingly, meaningless display is avoided.

In accordance with the camera-shake display device of another embodiment, the remaining camera-shake amount which is the difference between the camera-shake amount and the camera-shake compensation amount is displayed. Accordingly, the remaining camera-shake amount after the compensation, that is, the camera-shake amount remaining on the photograph can be known.

In accordance with the camera-shape display device of another embodiment, no display is made when the photographing lens is not provided with the compensation optical system. Accordingly, the mistaken belief that the photographing lens is provided with the compensation optical system is prevented.

What is claimed is:

1. A camera-shake display device comprising:

detecting means for determining whether a photographing lend detachably mounted on a camera body has a compensation optical system that compensates for camera-shake in accordance with a camera-shake amount; and display means for displaying, independently of camera-shake whether camera-like compensation is attainable or not in accordance with an output of said detection means.

2. A camera-shake display device according to claim 1 wherein said detection means receives a signal representing the camera-shake amount from the camera body.

3. A camera-shake display device according to claim 1 wherein said detection means receives a signal representing the camera-shake amount from the photographing lens.

4. A camera-shake display device according to claim 1 wherein said display means displays that camera-shake compensation is attainable when said detection means determines that the photographing lens has the compensation optical system, and displays that camera-shake compensation is not attainable when said detection means determines that the photographing lens does not have the compensation optical system.

5. A camera-shake display device according to claim 1 further comprising:

mount detection means for determining whether the photographing lens is mounted on the camera body; and extinguish means for extinguishing the display of said display means when said mount detection means determines that the photographing lens is not mounted on the camera body.

6. A camera-shake display device according to claim 4, including:

a plurality of display areas provided in said display means; and control means for switching the turn-on and the turn-off of at least one of said display areas in accordance with the output of said detection means.

7. A camera-shake display device according to claim 4 including:

a predetermined display area provided in said display means; and display switching means for switching the display of said predetermined display area from a first display to a second display in accordance with the output of said detection means.

8. A camera-shake display device comprising:

detection means for determining whether a detachable photographing lens has data of permissible camera-shake amount when the photographing lens is mounted on a camera body; and display means for displaying predetermined permissible camera-shake amount when said detection means determines that the photographing lens does not have data of permissible camera-shake amount, and displaying permissible camera-shake amount based on the data of permissible camera-shake amount of the photographing lens when said detection means determines that the photographing lens has the data of permissible camera-shake amount.

9. A camera-shake display device according to claim 8 further comprising:

mount detection means for determining whether the photographing lens is mounted on the camera body; and extinguish means for extinguishing the display of said display means when said mount detection means determines that the photographing lens is not mounted on the camera body.

10. A camera-shake display device according to claim 8 including:

a plurality of displaying area provided in said display means;

selection means for selecting one of said display areas in accordance with the data of permissible camera-shake amount; and control means of permitting the turn-on of the display area selected by said selection means and inhibiting the turn-on of the non-selected display areas.

11. A camera-shake display device comprising:

camera-shake amount detection means for detecting camera-shake amount representing a displacement of a camera on which a detachable photographing lens is mounted;

display means for displaying camera-shake amount detected by said camera-shake amount detection means;

mount detection means for determining whether the photographing lens is mounted on the camera body; and display inhibit means for inhibiting the display by said display means when said mount detection means determines that the photographing lens is not mounted on the camera body.

12. A camera-shake display device comprising:

camera-shake amount detection means for detecting camera-shake amount representing a displacement of a camera on which a detachable photographing lens is mounted;

camera-shake compensation means for compensating the camera-shake in accordance with the camera-shake amount detected by said camera-shake amount detection means;

compensation amount detection means for detecting the camera-shake compensation amount compensated by said camera-shake compensation means;

calculation means for calculating remaining camera-shake amount by subtracting the camera-shake compensation amount from the camera-shake amount; and display means for displaying the remaining camera-shake amount calculated by said calculation means.

13. A camera-shake display means according to claim 12 further comprising:

detection means for determining whether the photographing lens has a compensation optical system or not;

said compensation optical system compensating the camera-shake in accordance with the camera-shake amount; and display inhibit means for inhibiting the display by said display means when said detection means determines that the photographing lens does not have the compensation optical system.

14. A method of displaying camera-shake, comprising the step of:

determining whether a photographing lens mounted on a camera body has a compensation optical system that compensates for camera-shake in accordance with a camera-shake amount; and displaying, independently of camera-shake, whether camera-shake compensation is attainable or not in accordance with a result of said determining.

15. A method of displaying camera-shake, comprising the steps of:

determining whether a photographing lens has data of permissible camera-shake amount when the photographing lens is mounted on a camera body;

displaying a permissible camera-shake amount based on the data of permissible camera-shake amount when the result of said determining step is affirmative; and displaying a predetermined permissible camera-shake amount when the result of said determining step is negative.

16. A method of displaying camera-shake, comprising the steps of:

detecting a camera-shake amount representing a displacement of a camera to which a photographing lens is mountable;

determining whether the photographing lens is mounted on the camera body;

displaying the detected camera-shake amount when it is determining that the photographing lens is mounted on the camera body; and inhibiting displaying of the camera-shake amount when it is determining that the photographing lens is not mounted on the camera body.

17. A method of displaying camera-shake, comprising the steps of:

detecting a camera-shake amount representing a displacement of a camera to which a photographing lens is mountable;

performing camera-shake compensation in accordance with the detecting camera-shake compensation;

detecting the amount of camera-shake compensation;

calculating a remaining camera-shake amount by subtracting the camera-shake compensation amount from the camera-shake amount; and displaying the calculated remaining camera-shake amount.

18. A camera-shake display device comprising:

a detector which determines whether a photographing lens detachably mounted on a camera has a compensation optical system that compensates for camera-shake in accordance with a camera-shake amount; and a display which displays, independently of camera-shake, whether camera-shake compensation is attainable or not in accordance with an output of said detector.

19. A camera-shake display device according to claim 18 wherein said detector receives a signal representing the camera-shake amount from the camera.

20. A camera-shake display device according to claim 18 wherein said detector receives a signal representing the camera-shake amount from the photographing lens.

21. A camera-shake display device according to claim 18 wherein said display displays that the camera-shake compensation is attainable when said detector determines that the photographing lens has the compensation optical system, and displays that the camera-shake compensation is not attainable when said detector determines that the photographing lens does not have the compensation optical system.

22. A camera-shake display device according to claim 18 further comprising:

a mount detector to determine whether the photographing lens is mounted on the camera; and a display controller to change the display mode of said display when said mount detector determines that the photographing lens is not mounted on the camera.

23. A camera-shake display device comprising:

a detector to determine whether a detachable photographing lens has data of permissible camera-shake amount when the photographing lens is mounted on a camera; and a display to display predetermined permissible camera-shake amount when said detector determines that the photographing lens does not have data of permissible camera-shake amount, and to display permissible camera-shake amount based on data of permissible camera-shake amount of the photographing lens when said detector determines that the photographing lens has the data of permissible camera-shake amount.

24. A camera-shake display device according to claim 23 further comprising:

a mount detector to determine whether the photographing lens is mounted on the camera; and a display controller to change the display mode of said display when said mount detector determines that the photographing lens is not mounted on the camera.

25. A camera-shake display device comprising:

a camera-shake amount detector to detect camera-shake amount representing a displacement of a camera on which a detachable photographing lens is mounted;

a display to display camera-shake amount detected by said camera-shake amount detector;

a mount detector to determine whether the photographing lens is mounted on the camera; and a display controller to inhibit displaying by said display when said mount detector determines that the photographing lens is not mounted on the camera.

26. A camera-shake display device comprising:

a camera-shake amount detector to detect camera-shake amount representing a displacement of a camera on which a detachable photographing lens is mounted;

a camera-shake compensator to compensate the camera-shake in accordance with the camera-shake amount detected by said camera-shake amount detector;

a compensation amount detector to detect the camera-shake compensation amount compensated by said camera-shake compensator;

a calculator to calculate remaining camera-shake amount by subtracting the camera-shake compensation amount from the camera-shake amount; and a display to display the remaining camera-shake amount calculated by said calculator.

27. A camera-shake display device according to claim 26 further comprising:

a detector to determine whether the photographing lens has a compensation optical system or not;

said compensation optical system compensating the camera-shake in accordance with the camera-shake amount; and a display controller to inhibit displaying by said display when said detector determines that the photographing lens has the compensation optical system.

28. A camera-shake display device according to claim 23 including:

a plurality of display areas provided in said display;

a selector to select one of said display areas in accordance with the data of permissible camera-shake amount; and a controller to permit the turn-on of the display area selected by said selector and to inhibit the turn-on of the non-selected display areas.

29. A camera-shake display device according to claim 21 including:

a plurality of display areas provided in said display; and a controller to switch the turn-on and turn-off of at least one of said display areas in accordance with the output of said detector.

30. A camera-shake display device according to claim 21 including:

a predetermined display area provided in said display; and a display controller to switch the display of said predetermined display area from a first display mode to a second display mode in accordance with the output of said detector.

31. A camera comprising:

a camera-shake detector to detect camera-shake amount indicating a displacement of the camera and to generate a signal representing the camera-shake amount;

a lens detector to determine independently of camera-shake, whether a photographing lens detachably mounted on the camera has a compensation optical system that compensates for camera-shake upon reception of the signal from said camera-shake detector.

32. A camera according to claim 31 further comprising:

a display to display whether or not said photographing lens has said compensation optical system in accordance with an output of said lens detector.

* * * * *

UNITED STATES PATENT AND TRADEMARK OFFICE
CERTIFICATE OF CORRECTION

PATENT NO. : 5,537,185
DATED : July 16, 1996
INVENTOR(S) : Sueyuki OHISHI et al.

It is certified that error appears in the above-indentified patent and that said Letters Patent is hereby corrected as shown below:

<u>IN COLUMN 10</u>:

Claim 1, line 8:

"like" should read --shake--.

Signed and Sealed this

Fifth Day of August, 1997

Attest:

BRUCE LEHMAN

Attesting Officer    Commissioner of Patents and Trademarks